United States Patent
Tsai (10) Patent No.: US 12,510,783 B2
(45) Date of Patent: Dec. 30, 2025

(54) LIGHT DIFFUSION SHEET, BACKLIGHT UNIT, LIQUID CRYSTAL DISPLAY DEVICE, AND INFORMATION EQUIPMENT

(71) Applicant: KEIWA Inc., Tokyo (JP)

(72) Inventor: Chengheng Tsai, Tokyo (JP)

(73) Assignee: KEIWA Inc., Tokyo (JP)

( * ) Notice: Subject to any disclaimer, the term of this patent is extended or adjusted under 35 U.S.C. 154(b) by 0 days.

(21) Appl. No.: 18/467,174

(22) Filed: Sep. 14, 2023

(65) Prior Publication Data
US 2024/0012286 A1    Jan. 11, 2024

Related U.S. Application Data

(63) Continuation of application No. PCT/JP2022/004369, filed on Feb. 4, 2022.

(30) Foreign Application Priority Data

Mar. 19, 2021 (JP) .................. 2021-045467
Feb. 2, 2022 (JP) .................. 2022-015101

(51) Int. Cl.
  *G02F 1/1335*  (2006.01)
  *G02F 1/13357*  (2006.01)

(52) U.S. Cl.
  CPC .. *G02F 1/133607* (2021.01); *G02F 1/133605* (2013.01)

(58) Field of Classification Search
  CPC .............. G02F 1/133607; G02F 1/133605
  USPC ................................................ 362/97.1
  See application file for complete search history.

(56) References Cited

U.S. PATENT DOCUMENTS

| | | |
|---|---|---|
| 2003/0002158 A1 | 1/2003 | Masaki et al. |
| 2008/0137204 A1 | 6/2008 | Yoshinari et al. |
| 2010/0238548 A1 | 9/2010 | Watanabe et al. |
| 2010/0309411 A1* | 12/2010 | Shibata ............... G02B 5/02 430/320 |
| 2016/0259115 A1 | 9/2016 | Kitano et al. |
| 2019/0196210 A1* | 6/2019 | Umemori ............ G09F 19/14 |
| 2020/0117052 A1* | 4/2020 | Yim ................... G02B 6/005 |
| 2020/0385500 A1* | 12/2020 | Kitayama ........... G02B 1/14 |
| 2021/0011305 A1* | 1/2021 | Chang .............. G02B 27/0172 |

(Continued)

FOREIGN PATENT DOCUMENTS

| | | |
|---|---|---|
| EP | 3719567 A1 | 10/2020 |
| JP | 2002-343121 A | 11/2002 |

(Continued)

OTHER PUBLICATIONS

International Search Report and Written Opinion for PCT/JP2022/004369 (ISA/JP) mailed Apr. 4, 2022 w/English translation (16 pages).

(Continued)

*Primary Examiner* — James R Greece
*Assistant Examiner* — Hana S Featherly
(74) *Attorney, Agent, or Firm* — JCIPRNET (57) ABSTRACT

A light diffusion sheet 43 includes: a first surface 21a as a light emission surface; and a second surface 21b as a light incident surface. The first surface 21a includes a plurality of recesses 22 each having an approximately inverted polygonal pyramid shape. The second surface 21b has an arithmetic mean roughness of 3.0 μm or less. The light diffusion sheet 43 has an internal haze of 1.5% or less.

16 Claims, 4 Drawing Sheets

(56) References Cited

U.S. PATENT DOCUMENTS

2021/0274616 A1* 9/2021 Kanemitsu ........... H05B 45/345
2022/0004058 A1    1/2022 Tsai et al.
2022/0326571 A1   10/2022 Tsai et al.

FOREIGN PATENT DOCUMENTS

| JP | 2011-002742 A | 1/2011 |
| JP | 2011-129277 A | 6/2011 |
| JP | 2012-114003 A | 6/2012 |
| JP | 2014-059524 A | 4/2014 |
| JP | 2017-110133 A | 6/2017 |
| JP | 2020-086432 A | 6/2020 |
| TW | 202030534 A | 8/2020 |

OTHER PUBLICATIONS

Extended European Search Report for EP Patent Application No. 22770922.7 dated Jul. 22, 2024 (9 pages).

* cited by examiner

LIGHT DIFFUSION SHEET, BACKLIGHT UNIT, LIQUID CRYSTAL DISPLAY DEVICE, AND INFORMATION EQUIPMENT

CROSS REFERENCE TO RELATED APPLICATIONS

This application is a bypass continuation of International Application No. PCT/JP2022/004369, filed Feb. 4, 2022, which international application claims priority to and the benefit of Japanese Application No. 2021-045467, filed Mar. 19, 2021, and Japanese Application No. 2022-015101, filed Feb. 2, 2022; the contents of all of which as are hereby incorporated by reference herein in their respective entireties.

TECHNICAL FIELD

The present disclosure relates to a light diffusion sheet, a backlight unit, a liquid crystal display device, and information equipment.

BACKGROUND ART

Liquid crystal display devices (hereinafter also referred to as liquid crystal displays) have been widely used as display devices for various types of information equipment such as smartphones and tablet terminals in recent years. As backlights of liquid crystal displays, a direct-lit type in which light sources are disposed at the rear of a liquid crystal panel or an edge-lit type in which light sources are disposed near side surfaces of a liquid crystal panel has been mainly employed.

In the case of employing the direct-lit backlight, a light diffusion sheet is used to increase and uniformity of luminance and chromaticity over the entire screen by diffusing light from light sources such as light emitting diodes (LEDs) (see, for example, Patent Document 1).

A light diffusion sheet diffuses light incident from a light incident surface by utilizing diffusion caused by an uneven shape on a light emission surface or diffusion caused by dispersion, in a sheet base material, of fine particles having a refractive index different from the base material.

A thin display of a device such as a laptop computer or a tablet terminal uses a light diffusion sheet in which a light emission surface has inverted pyramidal recesses and a light incident surface is embossed.

CITATION LIST

Patent Document

Patent Document 1: Japanese Patent Application Publication No. 2011-129277

SUMMARY OF THE INVENTION

Technical Problem

In the direct-lit backlight, however, light sources are disposed immediately under the display screen, and thus, when the distance from the light sources to the light diffusion sheet and/or the thickness of the light diffusion sheet is reduced with thickness reduction of the display, it becomes difficult to sufficiently diffuse light by the light diffusion sheet. Consequently, there arises the problem of degradation of uniformity of luminance in the screen (in-plane luminance uniformity).

It is therefore an object of the present disclosure to provide a light diffusion sheet capable of enhancing in-plane luminance uniformity.

Solution to the Problem

To achieve the object, a first light diffusion sheet according to the present disclosure is a light diffusion sheet including: a first surface as a light emission surface; and a second surface as a light incident surface, wherein the first surface includes a plurality of recesses each having an approximately inverted polygonal pyramid shape, the second surface is a flat surface with an arithmetic mean roughness of 0.1 μm or less, and an internal haze of the light diffusion sheet is 1.5% or less.

In the first light diffusion sheet according to the present disclosure, since the second surface as the light incident surface is a flat surface and an internal haze of the light diffusion sheet is 1.5% or less, light incident from the second surface reaches the first surface as an uneven surface substantially without being diffused in the sheet. Thus, high-luminance light that has traveled straight from the light sources toward the light diffusion sheet can be uniformly diffused by the recesses on the first surface, and thus, an image of the light sources is canceled and in-plane luminance uniformity can be enhanced. As a result, it is possible to achieve further reduction of thickness and reduction of the number of light sources.

A second light diffusion sheet according to the present disclosure is a light diffusion sheet including: a first surface as a light emission surface; and a second surface as a light incident surface, wherein the first surface includes a plurality of recesses each having an approximately inverted polygonal pyramid shape, the second surface has an arithmetic mean roughness of 1.0 μm or more and 3.0 μm or less, and an internal haze of the light diffusion sheet is 1.5% or less.

In the second light diffusion sheet according to the present disclosure, since the second surface as the light incident surface has an arithmetic mean roughness of 3.0 μm or less and the internal haze of the light diffusion sheet is 1.5% or less, light incident from the second surface reaches the first surface as an uneven surface substantially without diffusing in the sheet. Thus, high-luminance light that has traveled straight from the light sources toward the light diffusion sheet can be uniformly diffused by the recesses on the first surface, and thus, an image of the light sources is canceled and in-plane luminance uniformity can be enhanced. In addition, since the arithmetic mean roughness of the second surface as the light incident surface is 1.0 μm or more, degradation of luminance can be reduced. As a result, it is possible to achieve further reduction of thickness and reduction of the number of light sources.

In the first or second light diffusion sheet according to the present disclosure, each of the recesses may have an approximately inverted quadrangular pyramid shape. In this case, light that has traveled straight from the light sources can be uniformly diffused by the first surface.

In the first or second light diffusion sheet according to the present disclosure, each of the plurality of recesses may have an apical angle of 80° or more and 100° or less. In this case, light that has traveled straight from the light sources can be uniformly diffused by the first surface.

A backlight unit according to the present disclosure is a backlight unit incorporated in a liquid crystal display device and configured to guide light from a plurality of light sources toward a display screen, the backlight unit and includes: the first or second light diffusion sheet according to the present disclosure located between the display screen and the plurality of light sources, wherein the first or second light diffusion sheet is disposed with the second surface facing the plurality of light sources.

Since the backlight unit according to the present disclosure includes the first or second light diffusion sheet according to the present disclosure, in-plane luminance uniformity can be enhanced. Accordingly, it is possible to achieve further reduction of thickness and reduction of the number of light sources.

In the backlight unit according to the present disclosure, the plurality of light sources may be disposed on a reflective sheet located at a side opposite to the display screen with respect to the light diffusion sheet. In this case, light is further diffused by multiple reflection between the light diffusion sheet and the reflective sheet so that in-plane luminance uniformity can be thereby further enhanced.

In the backlight unit according to the present disclosure, the light diffusion sheet may include a plurality of the light diffusion sheets that are disposed between the display screen and the plurality of light sources. In this case, light that has traveled straight from the light sources is repeatedly diffused by the first surface of each of the light diffusion sheets so that in-plane luminance uniformity can be thereby further enhanced.

In the backlight unit according to the present disclosure, a distance between the plurality of light sources and the light diffusion sheet may be 10 mm or less. In this case, diffusion property of the light diffusion sheet according to the present disclosure can suppress degradation of in-plane luminance uniformity.

A liquid crystal display device according to the present disclosure includes: the backlight unit according to the present disclosure described above; and a liquid crystal display panel.

Since the liquid crystal display device according to the present disclosure includes the backlight unit according to the present disclosure, in-plane luminance uniformity can be enhanced. Thus, it is possible to achieve further reduction of thickness and reduction of the number of light sources.

Information equipment according to the present disclosure includes the liquid crystal display device according to the present disclosure described above.

Since the information equipment according to the present disclosure includes the liquid crystal display device according to the present disclosure, in-plane luminance uniformity can be enhanced. Thus, it is possible to achieve further reduction of thickness and reduction of the number of light sources.

Advantages of the Invention

According to the present disclosure, a light diffusion sheet capable of increasing in-plane luminance uniformity can be provided.

DESCRIPTION OF EMBODIMENTS

Embodiment

A light diffusion sheet, a backlight unit, a liquid crystal display device, and information equipment according to an embodiment will be described hereinafter with reference to the drawings. The scope of the present disclosure is not limited to the following embodiment, and can be arbitrarily changed within the scope of the technical idea of the present disclosure.

Figure 1:
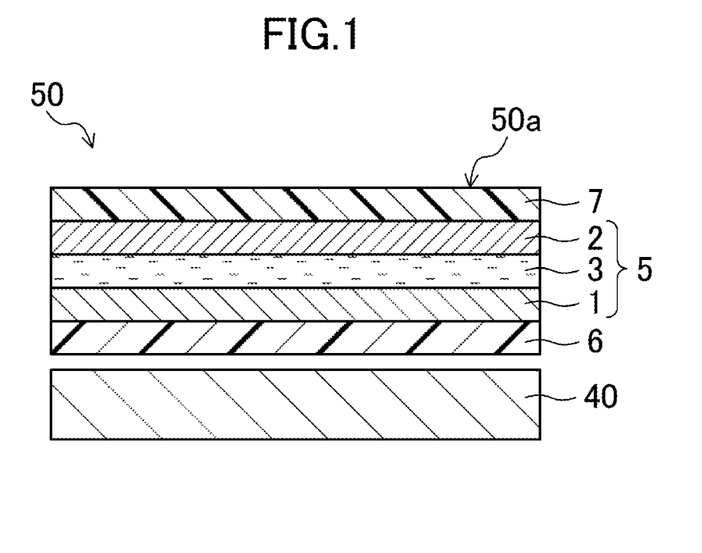
FIG. 1 A cross-sectional view of a liquid crystal display device according to an embodiment.
Figure 2:
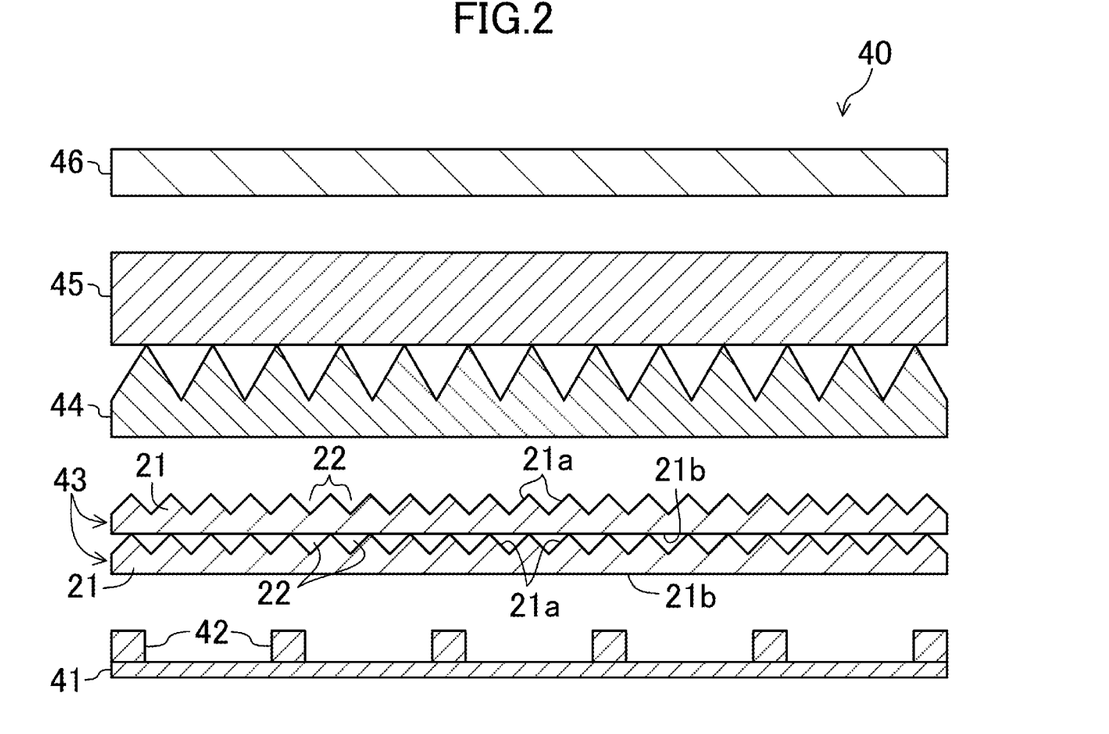
FIG. 2 A cross-sectional view of a backlight unit according to an embodiment.
Figure 3:
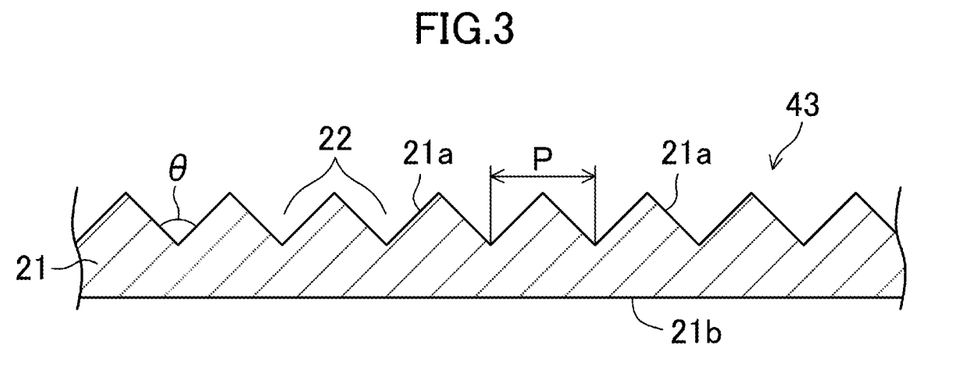
FIG. 3 A cross-sectional view of a light diffusion sheet according to an embodiment.

FIG. 1 is an example of a cross-sectional view of a liquid crystal display device according to this embodiment. FIG. 2 is an example of a cross-sectional view of a backlight unit according to this embodiment. FIG. 3 is an example of a cross-sectional view of a light diffusion sheet according to this embodiment.

As illustrated in FIG. 1, a liquid crystal display device 50 includes a liquid crystal display panel 5, a first polarizing plate 6 attached to a lower surface of the liquid crystal display panel 5, a second polarizing plate 7 attached to an upper surface of the liquid crystal display panel 5, and a backlight unit 40 disposed at the rear of the liquid crystal display panel 5 with the first polarizing plate 6 interposed therebetween. The liquid crystal display panel 5 includes a TFT substrate 1 and a CF substrate 2 that are opposed to each other, a liquid crystal layer 3 disposed between the TFT substrate 1 and the CF substrate 2, and a seal member (not shown) having a frame shape in order to enclose the liquid crystal layer 3 between the TFT substrate 1 and the CF substrate 2.

The shape of a display screen 50a of the liquid crystal display device 50 when seen from the front (from above in FIG. 1) is, but not limited to, a rectangle or a square in principle, and may be a rounded rectangle, an oval, a circle, a trapezoid, or any shape such as an instrument panel of an automobile.

In the liquid crystal display device 50, in each sub-pixel corresponding to a pixel electrode, an alignment state of the liquid crystal layer 3 is changed by applying a predetermined voltage to the liquid crystal layer 3. Accordingly, transmittance of light incident from the backlight unit 40 through the first polarizing plate 6 is adjusted. The light whose transmittance has been adjusted is emitted through the second polarizing plate 7 so that an image is displayed.

The liquid crystal display device 50 according to this embodiment is used as a display device to be incorporated in various types of information equipment (e.g., an onboard device such as a car navigation system, a personal computer, a cellular phone, a portable information terminal, a portable game machine, a copying machine, a ticket machine, or an automatic teller machine).

The TFT substrate 1 includes, for example, a plurality of TFTs arranged in a matrix on a glass substrate, an interlayer insulating film covering the TFTs, a plurality of pixel electrodes arranged in a matrix on the interlayer insulating film and individually connected to the TFTs, and an alignment film covering the pixel electrodes. The CF substrate 2 includes, for example, a black matrix disposed on the glass substrate and having a lattice pattern, color filters including a red layer, a green layer, and a blue layer disposed between the gratings of the black matrix, a common electrode covering the black matrix and the color filters, and an alignment film covering the common electrode. The liquid crystal layer 3 is made of, for example, a nematic liquid crystal material including liquid crystal molecules with electrooptic properties. Each of the first polarizing plate 6 and the second polarizing plate 7 includes, for example, a polarizer layer having a polarization axis in one direction, and a pair of protective layers sandwiching the polarizer layer.

As illustrated in FIG. 2, the backlight unit 40 includes a reflective sheet 41, a plurality of light sources 42 arranged in two dimensions on the reflective sheet 41, a light diffusion sheet 43 disposed above the light sources 42, a first prism sheet 44 and a second prism sheet 45 stacked in this order above the light diffusion sheet 43, and a polarizing sheet 46 disposed above the second prism sheet 45.

In the example illustrated in FIG. 2, two layers of the light diffusion sheets 43 having the same structure are stacked in the backlight unit 40. Alternatively, the light diffusion sheet 43 may be used as a single layer, or three or more layers of the light diffusion sheets 43 may be used.

The reflective sheet 41 is, for example, white polyethylene terephthalate resin film or a silver evaporated film.

Although not particularly limited, the light sources 42 may be, for example, an LED device or a laser device, and an LED device may be used from the viewpoint of costs, productivity, and other reasons. Each of the light sources 42 may be rectangular in plan view. In this case, the length of one side may be 10 µm or more (preferably 50 µm or more) and 20 mm or less (preferably 10 mm or less, more preferably 5 mm or less). In the case of using LEDs as the light sources 42, a plurality of LED chips may be arranged at regular intervals on the reflective sheet 41. To adjust light emission angle characteristics of the LEDs as the light sources 42, the LEDs may be equipped with lenses.

As illustrated in FIGS. 2 and 3, the light diffusion sheet 43 includes a base material layer 21. The base material layer 21 uses clear polycarbonate as a base material (matrix resin), for example. The base material layer 21 contains substantially no diffusion agent. The light diffusion sheet 43 (base material layer 21) includes a first surface 21a serving as a light emission surface and a second surface 21b serving as a light incident surface. That is, the light diffusion sheet 43 is oriented with the second surface 21b facing the light sources 42.

On the first surface 21a of the light diffusion sheet 43, a plurality of recesses 22 each having an approximately inverted polygonal pyramid shape, for example, an approximately inverted quadrangular pyramid shape (inverted pyramid shape) are arranged in two dimensions. On the other hand, the second surface 21b of the light diffusion sheet 43 has an arithmetic mean roughness of 3.0 µm or less.

The light diffusion sheet 43 (base material layer 21) has an internal haze of 1.5% or less. The "internal haze" refers to a haze obtained by removing a surface haze derived from the surface shape (specifically the recesses 22 on the first surface 21a) from all the haze.

An apical angle θ of each of the recesses 22 is 80° or more and 100° or less, for example, 90°, and an arrangement pitch p of the recesses 22 is, for example, about 100 µm. Here, the apical angle θ of each recess 22 refers to an angle formed by cross-sectional lines of slopes in a cross section obtained by cutting the recess 22 in a plane (longitudinal section) perpendicular to the second surface 21b (horizontal plane) of the light diffusion sheet 43 passing a vertex of the inverted polygonal pyramid and perpendicularly crossing a pair of slopes opposed to each other with the vertex sandwiched therebetween. The arrangement pitch p of the recesses 22 refers to a horizontal distance (distance along a direction parallel to the second surface 21b) between the vertexes of inverted polygonal pyramids of adjacent ones of the recesses 22.

In this embodiment, the light diffusion sheet 43 has a single-layer structure of the base material layer 21 in which the first surface 21a has an uneven shape (recesses 22). Alternatively, the light diffusion sheet 43 may have a double-layer structure including a base material layer having flat surfaces and a layer having an uneven shape at one surface, or may have a structure of three of more layers including a layer having an uneven shape at one surface.

Although the inverted pyramidal (approximately inverted quadrangular pyramidal) recesses 22 are arranged in two dimensions so that the first surface 21a has an uneven shape in this embodiment, the recesses 22 may have other approximately inverted polygonal pyramid shapes, and/or the recesses 22 may be arranged at random not to impair advantages of the present disclosure.

In the present disclosure, in consideration of difficulty in forming geometrically strict inverted polygonal pyramidal recesses by a normal shape transfer technique, the term "approximately inverted polygonal pyramid/pyramidal" is used, but the "approximately inverted polygonal pyramid/pyramidal" includes a true inverted polygonal pyramid and a shape that can be substantially regarded as an inverted polygonal pyramid. The term "approximately" means that approximation is possible. For example, an "approximately inverted quadrangular pyramid" refers to a shape that can be approximated to an inverted quadrangular pyramid. For example, the "approximately inverted polygonal pyramid" also includes an "inverted truncated polygonal pyramid" with a flat top whose area is small to such an extent that the advantages of the present disclosure are not lost. The "approximately inverted polygonal pyramid" also includes a shape deformed from an "inverted polygonal pyramid" within a range of unavoidable shape variation caused by processing accuracy in industrial production.

The "inverted polygonal pyramid" shape of the recesses 22 is preferably a triangular pyramid, a quadrangular pyramid, or a hexagonal pyramid that can be arranged without gaps in two dimensions. An inverted quadrangular pyramid may be selected as the "inverted polygonal pyramid" in consideration of accuracy in surface cutting work of a die (metal roll) used in a fabrication process such as extrusion molding or injection molding in forming the recesses 22. In a case where the recesses 22 are regularly arranged in two dimensions, the recesses 22 may be arranged without gaps or may be arranged at regular intervals on the first surface 21a.

Each of the first prism sheet 44 and the second prism sheet 45 is a film formed such that a plurality of grooves each having an isosceles triangle shape in a cross section are arranged adjacent to one another and an apical angle of a prism sandwiched between a pair of adjacent grooves is about 90°. The grooves formed on the first prism sheet 44 are perpendicular to the grooves formed on the second prism sheet 45. The first prism sheet 44 and the second prism sheet 45 may be integrated. Each of the first prism sheet 44 and the second prism sheet 45 may be a polyethylene terephthalate (PET) film having a prism shape by using an UV setting acrylic resin.

The polarizing sheet 46 may be, for example, a sheet of a DBEF series manufactured by 3M Corporation. The polarizing sheet 46 enhances luminance of the display screen 50a by preventing absorption of light emitted from the backlight unit 40 in the first polarizing plate 6 of the liquid crystal display device 50.

In the light diffusion sheet 43 according to this embodiment described above, the first surface 21a as a light emission surface has the plurality of recesses 22 each having an approximately inverted polygonal pyramid shape, the second surface 21b as a light incident surface has an arithmetic mean roughness of 3.0 μm or less, and an internal haze of the light diffusion sheet is 1.5% or less. Thus, light incident from the second surface 21b is not substantially diffused in the light diffusion sheet 43 (base material layer 21) and reaches the first surface 21a as an uneven surface. Accordingly, high-luminance light that has traveled straight from the light sources 42 toward the light diffusion sheet 43 can be uniformly diffused by the recesses 22 of the first surface 21a, and thus, an image of the light sources 42 is canceled in the display screen 50a so that in-plane luminance uniformity can be thereby enhanced. As a result, it is possible to achieve further reduction of thickness and reduction of the number of light sources.

Figure 4:
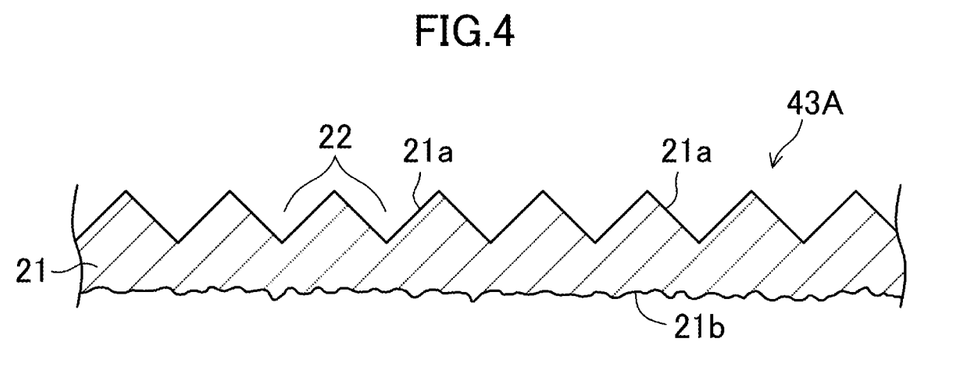
FIG. 4 A cross-sectional view of a light diffusion sheet according to a comparative example.

FIG. 4 illustrates a cross-sectional structure of a light diffusion sheet 43A of a comparative example in which unevenness is formed in a second surface 21b by embossing. In FIG. 4, the same components as those of the light diffusion sheet 43 according to this embodiment illustrated in FIG. 3 are denoted by the same reference characters. In the light diffusion sheet 43A of the comparative example, light that has traveled straight from the light sources 42 is diffused at random at the second surface 21b, and thus, cannot be uniformly diffused by the recesses 22 of the first surface 21a. In other words, the degree of canceling an image of the light sources 42 varies depending on the position of the light sources 42 on the first surface 21a. As a result, there arises the problem of degradation of in-plane luminance uniformity.

To solve the problem, in the light diffusion sheet 43, the arithmetic mean roughness of the second surface 21b as a light incident surface is set at 3.0 μm or less. From the viewpoint of enhancing in-plane luminance uniformity, the arithmetic mean roughness of the second surface 21b of the light diffusion sheet 43 is preferably 0.5 μm or less, more preferably 0.3 μm or less, even more preferably 0.1 μm or less, still more preferably 0.05 μm. On the other hand, from the viewpoint of suppressing decrease in luminance, the arithmetic mean roughness of the second surface 21b of the light diffusion sheet 43 is preferably 0.1 μm or more, more preferably 0.5 μm or more, even more preferably 1.0 μm or more.

The problem of degradation of in-plane luminance uniformity also arises in the case of performing light diffusion by dispersing fine particles (diffusion agent) having a refractive index different from the base material layer 21 in the base material layer 21. That is, in the light diffusion sheet 43 according to this embodiment, a diffusion agent content, that is, an internal haze, is preferably as small as possible. Specifically, the internal haze of the light diffusion sheet 43 is preferably 5% or less, more preferably 3% or less, even more preferably 1.5% or less, still more preferably 1.0% or less.

In the light diffusion sheet 43 according to this embodiment, when each of the recesses 22 has an approximately inverted quadrangular pyramid shape, light that has traveled straight from the light sources 42 can be uniformly diffused by the first surface 21a.

In the light diffusion sheet 43 according to this embodiment, in a case where an apical angle of each recess 22 is 80° or more and 100° or less, light that has traveled straight from the light sources 42 can be uniformly diffused by the first surface 21a.

The backlight unit 40 according to this embodiment is incorporated in the liquid crystal display device 50, and guides light emitted from the light sources 42 toward the display screen 50a. In the backlight unit 40, the light diffusion sheet 43 according to this embodiment is disposed between the display screen 50a and the light sources 42 with the second surface 21b facing the light sources 42. Accordingly, the light diffusion sheet 43 can enhance in-plane luminance uniformity, and thus, it is possible to achieve further reduction of thickness and reduction of the number of light sources.

In the backlight unit 40 according to this embodiment, the light sources 42 may be disposed on the reflective sheet 41 located at the side opposite to the display screen 50a with respect to the light diffusion sheet 43. In this case, light is further diffused by multiple reflection between the light diffusion sheet 43 and the reflective sheet 41 so that in-plane luminance uniformity can be thereby further enhanced.

In the backlight unit 40 according to this embodiment, the light diffusion sheet 43 may include a plurality of the light diffusion sheets 43 that are disposed between the display screen 50a and the light sources 42. In this case, light that has traveled straight from the light sources 42 is repeatedly diffused by the first surface 21a of each of the light diffusion sheets 43 so that in-plane luminance uniformity can be thereby further enhanced.

In the backlight unit 40 according to this embodiment, in a case where a distance between the light sources 42 and the light diffusion sheet 43 is 10 mm or less, diffusion property of the light diffusion sheet 43 can suppress degradation of in-plane luminance uniformity, as compared to conventional techniques.

The liquid crystal display device 50 according to this embodiment includes the backlight unit 40 according to this embodiment and the liquid crystal display panel 5. Thus, in-plane luminance uniformity can be enhanced by the backlight unit 40 so that it is possible to achieve further reduction of thickness and reduction of the number of light sources. Similar advantages can also be obtained in information equipment (e.g., a personal computer or a cellular phone) in which the liquid crystal display device 50 according to this embodiment is incorporated.

In this embodiment, arrangement and the number of the light sources 42 are not particularly limited, and in a case where the light sources 42 are dispersed, the light sources 42 are preferably regularly arranged on the reflective sheet 41. The expression "regularly arranged" refers to arrangement with a fixed rule and corresponds to, for example, a case where the light sources 42 are arranged at regular intervals. In the case where the light sources 42 are arranged at regular intervals, a distance between centers of two adjacent light sources 42 may be 0.5 mm or more (preferably 2 mm or more) and 20 mm or less.

In this embodiment, the light diffusion sheet 43 (base material layer 21) may be a diffusion agent or other additives as long as advantages of the present disclosure are not lost. Examples of the additives that can be contained include, but not limited to, inorganic particles of, for example, silica, titanium oxide, aluminium hydroxide, and barium sulfate, and organic particles of, for example, acrylic, acrylonitrile, silicone, polystyrene, and polyamide.

In this embodiment, a resin as a matrix of the base material layer 21 is not particularly limited as long as the resin is made of a light transmitting material, and the resin may be acrylic, polystyrene, polycarbonate, methyl methacrylate-styrene copolymer (MS) resin, polyethylene terephthalate, polyethylene naphthalate, cellulose acetate, or polyimide, for example.

In this embodiment, the thickness of the light diffusion sheet 43 is not particularly limited, and may be, for example, 3 mm or less (preferably 2 mm or less, more preferably 1.5 mm or less, even more preferably 1 mm or less), and 0.1 mm or more. If the thickness of the light diffusion sheet 43 exceeds 3 mm, it is difficult to achieve thickness reduction of a liquid crystal display. On the other hand, if the thickness of the light diffusion sheet 43 is less than 0.1 mm, it is difficult to obtain the effect of enhancing luminance uniformity described above. The light diffusion sheet 43 may have a film shape or a plate shape.

In this embodiment, the method for producing the light diffusion sheet 43 is not particularly limited and may be, for example, extrusion molding or injection molding.

A procedure of producing a single-layer light diffusion sheet including a surface with an uneven shape by extrusion molding will now be described. First, plastic particles in pellet form (that may be supplemented with a diffusion agent) is placed in a single-screw extruder, and melted and kneaded while being heated. Thereafter, the melted resin extruded by a T-die is cooled while being sandwiched between two metal rolls, and then conveyed with guide rolls and cut into a flat sheet by a sheet cutter, thereby producing a light diffusion sheet. Here, the melted resin is sandwiched with the metal rolls having a surface with an inverted shape of a desired uneven shape so that the inverted shape on the roll surface is thereby transferred to the resin. Thus, the desired uneven shape is formed on the surface of the light diffusion sheet. The shape transferred to the resin is not necessarily a shape on which the shape of the roll surface is 100% transferred, and thus, the shape of the roll surface may be designed by back calculation from the transfer degree.

In the case of producing a light diffusion sheet with a double-layer structure whose surface has an uneven shape by extrusion molding, it is sufficient that plastic particles in pellet form necessary for forming each layer is placed in each of two single-screw extruders, and then, a procedure similar to the procedure described above is performed on each layer, and resulting sheets are stacked.

Alternatively, a diffusion sheet with a double-layer structure whose surface has an uneven shape may be produced in the following manner. First, plastic particles in pellet form necessary for forming each layer is placed in each of two single-screw extruders, and the particles are melted and kneaded while being heated. Thereafter, the melted resin to be layers is placed in one T-die, layers of the resin are stacked in the T-die, and stacked melted resin layers extruded from the T-die are sandwiched between two metal rolls and cooled. Subsequently, the stacked melted resin layers are conveyed with guide rolls and cut into a flat sheet by a sheet cutter, thereby producing a diffusion sheet with a double-layer structure whose surface has an uneven shape.

Alternatively, the light diffusion sheet 43 may be produced by shape transfer with ultraviolet (UV) rays in the following manner. First, a roll having an inverted shape of an uneven shape to be transferred is filled with an uncured UV curable resin, and a base material is pushed against the resin. Next, with the roll filled with the UV curable resin being united with a base material, UV rays are applied to cure the resin. Thereafter, a sheet to which the uneven shape is transferred with the resin is peeled off from the roll. Lastly, the sheet was irradiated with UV rays again so that the resin is completely cured, thereby producing a light diffusion sheet whose surface has an uneven shape.

In this embodiment, as the backlight unit 40, a direct-lit backlight unit in which the light sources 42 are dispersed at the rear of the display screen 50a of the liquid crystal display device 50 is used. Thus, to reduce the size of the liquid crystal display device 50, the distance between the light sources 42 and the light diffusion sheet 43 needs to be reduced. However, when this distance is reduced, a phenomenon in which luminance of a portion of the display screen 50a located on a region between the dispersed light sources 42 is smaller than those of the other portion (luminance variation) tends to occur.

On the other hand, the use of the light diffusion sheet 43 according to this embodiment is useful for reducing luminance variation. In particular, for future thickness reduction of small and medium-sized liquid crystal displays, usefulness of the present disclosure is supposed to be more significant in a case where the distance between light sources and a light diffusion sheet is 15 mm or less, preferably 10 mm or less, more preferably 5 mm or less, even more preferably 2 mm or less, ultimately 0 mm.

EXAMPLES AND COMPARATIVE EXAMPLES

Examples and comparative examples will be described below.

Examples and comparative examples used light diffusion sheets each using clear polycarbonate as a base material and having a thickness of 130 μm. In both examples and comparative examples, a plurality of recesses each having an approximately inverted quadrangular pyramid (inverted pyramid) shape with an apical angle of 90° were arranged at a pitch of 100 μm in two dimensions on a first surface (light emission surface) of a light diffusion sheet. As examples, four types of light diffusion sheets having second surfaces (light incident surfaces) processed to have arithmetic mean roughnesses Ra of 2.6 μm, 1.8 μm, 1.2 μm, and 0.03 μm, respectively, were prepared. As a comparative example, light diffusion sheets each having a second surface (light incident surface) processed to have an arithmetic mean roughness Ra of 3.4 μm were prepared.

A method for producing light diffusion sheet according to examples is as follows. First, a base material resin (plastic resin) in pellet form was shaped in a resin film by an extruder. Thereafter, a roll whose surface has a convex pyramid shape was used as one of two metal rolls and a mirror roll was used as the other roll, and these rollers were brought into pressure contact with a resin film so that a single-layer light diffusion sheet whose one surface has an inverted pyramid shape and the other surface has a mirror surface was produced.

A method for producing a light diffusion sheet of a comparative example is as follows. First, a base material resin (plastic resin) in pellet form was shaped in a resin film by an extruder. Thereafter, a roll whose surface has a convex pyramid shape was used as one of two metal rolls and an embossed roll having a random matte shape was used as the other roll, and these rollers were brought into pressure contact with a resin film so that a single-layer light diffusion sheet whose one surface has an inverted pyramid shape and the other surface has an embossed surface was produced. A difference in roughness of the surface having an embossed shape was controlled based on roughness of the embossed roll surface.

A surface roughness (arithmetic mean roughness Ra) of each of light diffusion sheets of the examples and the comparative example was measured with an SJ-210 manufactured by Mitutoyo Corporation in conformity with JIS B 0601-1994 at a measurement speed of 0.5 mm/s, a measurement distance of 4 mm, and a cut-off value Xe of 0.8 mm.

An internal haze and a total light transmittance of the light diffusion sheet of each example were 0.6% and 90.8%, respectively. The internal haze and the total light transmittance were measured with recesses (inverted pyramids) of a first surface of the light diffusion sheet filled with a UV curable resin (same resin as matrix resin of the light diffusion sheet). As the UV curable resin, a resin having the same refractive index as that of the matrix resin of the light diffusion sheet was used. Measurement of the internal haze and the total light transmittance was conducted with a haze meter HZ-2 manufactured by Suga Test Instruments Co., Ltd. in conformity with JIS K 7136.

In-plane luminance uniformity of light diffusion sheets of the examples and the comparative example were evaluated in the following manner. First, two or three layers of light diffusion sheets of the examples (four types) and the comparative example were stacked on an array of blue LEDs arranged at a pitch of 2.8 mm, and two prism sheets were disposed on the stacked light diffusion sheets, and a transparent glass plate was placed on the prism sheets to prevent separation of the sheets and others. Then, luminance in an upward vertical direction (direction from the LED array toward the glass plate) was measured with a 2D luminance colorimeter UA-200 manufactured by TOPCON TECHNOHOUSE CORPORATION. Next, variations of light emission intensity among the LEDs were corrected for the obtained 2D luminance distribution image, and a filtering process for reducing bright spot/dark spot noise caused by foreign substance or the like was performed, and then, an average and a standard deviation were calculated for luminances of all the pixels. Lastly, "in-plane luminance uniformity" was defined as an "luminance average/luminance standard deviation," and in-plane luminance uniformity of the light diffusion sheets of the examples and the comparative example were calculated.

Table 1 shows evaluation results of luminance and in-plane luminance uniformity of the light diffusion sheets of the examples and the comparative examples. The luminance shown in Table 1 is relative luminance assuming that luminance (average) of a comparative example with the same number of stacks of the light diffusion sheets is one.

TABLE 1

|  | Surface (light emission surface) | Surface roughness Ra (μm) of back surface (light incident surface) | Number of stacks of sheets | Luminance (relative luminance assuming luminance of comparative example with the same number of stacks of sheets is 1) | Luminance uniformity |
| --- | --- | --- | --- | --- | --- |
| Comparative Example 1 | inverted pyramid | 3.4 | 2 | 1 | 98 |
| Example 1 | inverted pyramid | 2.6 | 2 | 0.99 | 128 |
| Example 2 | inverted pyramid | 1.8 | 2 | 1 | 126 |
| Example 3 | inverted pyramid | 1.2 | 2 | 1 | 132 |
| Example 4 | inverted pyramid | 0.03 | 2 | 0.83 | 171 |
| Comparative Example 2 | inverted pyramid | 3.4 | 3 | 1 | 207 |
| Example 5 | inverted pyramid | 2.6 | 3 | 0.97 | 223 |
| Example 6 | inverted pyramid | 1.8 | 3 | 1.01 | 234 |
| Example 7 | inverted pyramid | 1.2 | 3 | 1 | 255 |
| Example 8 | inverted pyramid | 0.03 | 3 | 0.83 | 286 |

In Table 1, Examples 1 through 4 are results of evaluation of luminance and in-plane luminance uniformity in the case of using two stacked light diffusion sheets of the above-described examples having the second surfaces (light incident surfaces) processed to have arithmetic mean roughnesses Ra of 2.6 μm, 1.8 μm, 1.2 μm, and 0.03 μm, respectively. Comparative Example 1 is a result of evaluation of luminance and in-plane luminance uniformity in the case of using two stacked light diffusion sheets of the above-described comparative example each having second surface processed to have an arithmetic mean roughness Ra of 3.4 μm. Examples 5 through 8 are examples of evaluation of luminance and in-plane luminance uniformity in the case of using three stacked light diffusion sheets of the above-described examples each having a second surface processed to have arithmetic mean roughnesses Ra of 2.6 μm, 1.8 μm, 1.2 μm, and 0.03 μm, respectively. Comparative Example 2 is a result of evaluation of luminance and in-plane luminance uniformity in the case of using three stacked light diffusion sheets of the above-described comparative example each having a second surface processed to have an arithmetic mean roughness Ra of 3.4 μm.

Figure 5:
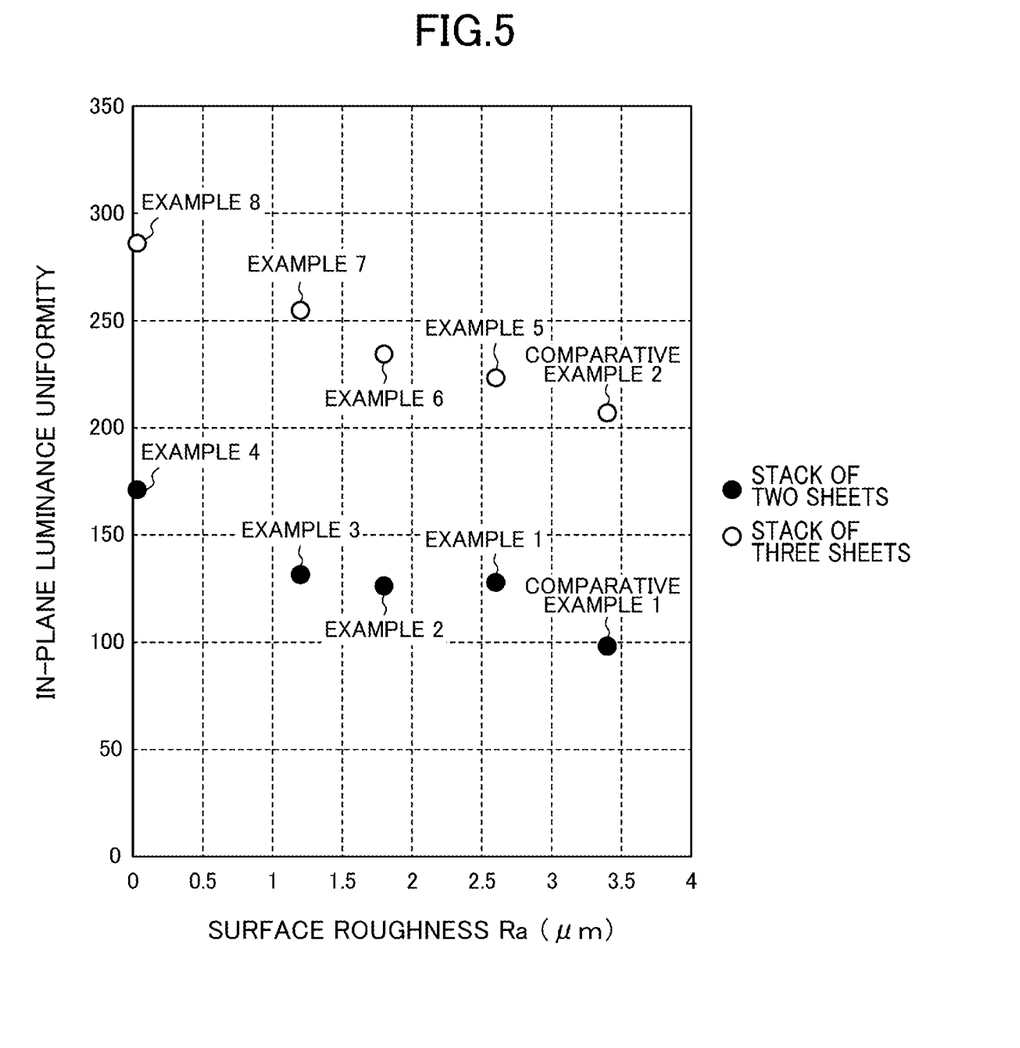
FIG. 5 A graph showing evaluation results of in-plane luminance uniformity of light diffusion sheets according to Examples 1 through 8 and Comparative Examples 1 and 2.
Figure 6:
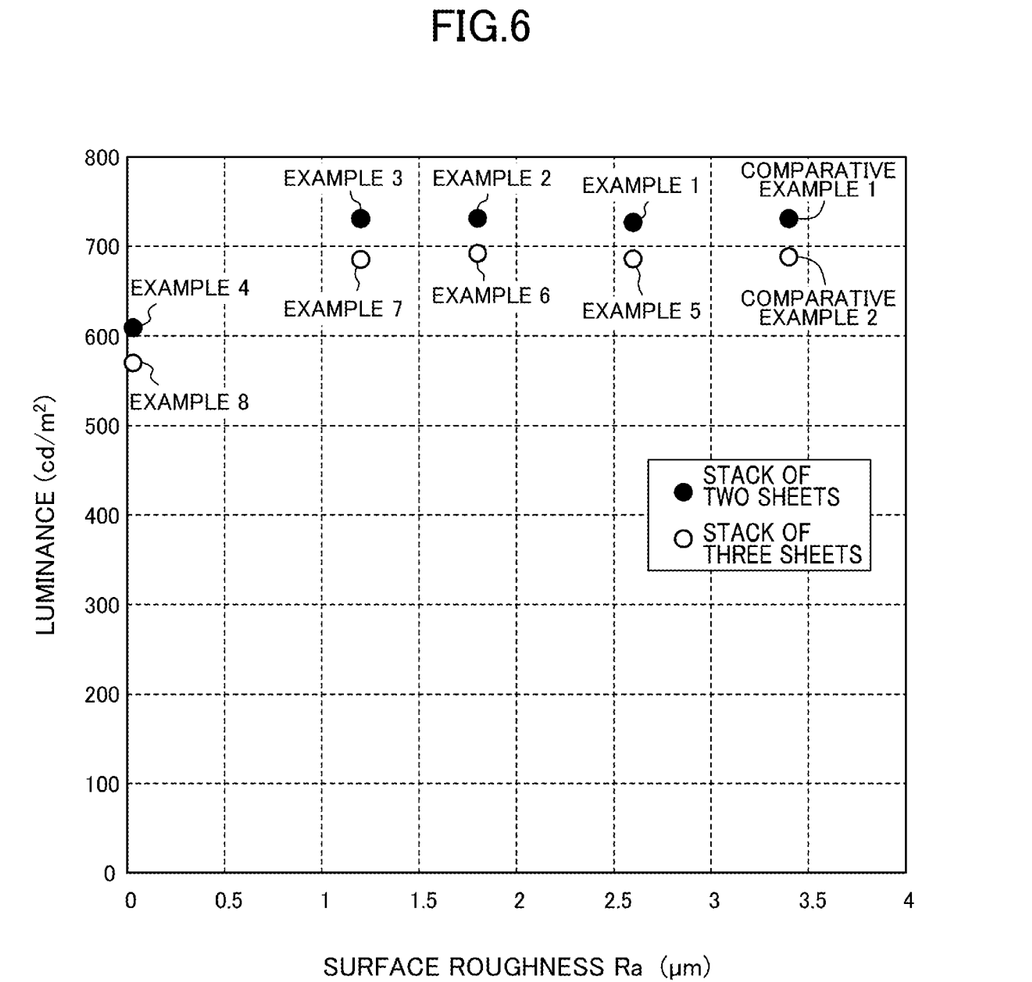
FIG. 6 A graph showing evaluation results of luminance of light diffusion sheets according to Examples 1 through 8 and Comparative Examples 1 and 2.

FIG. 5 shows a relationship between surface roughness (arithmetic mean roughness) Ra and in-plane luminance uniformity of a light incident surface of the light diffusion sheet of each of Examples 1 through 8 and Comparative Examples 1 and 2. FIG. 6 shows a relationship between surface roughness (arithmetic mean roughness) Ra and luminance of the light incident surface of the light diffusion sheet of each of Examples 1 through 8 and Comparative Examples 1 and 2.

As shown in Table 1 and FIG. 5, irrespective of the number of stacks of the light diffusion sheets, as the surface roughness Ra of the light incident surface decreased, in-plane luminance uniformity was enhanced. In particular, in the case where the surface roughness Ra of the light incident surface is the smallest, that is, 0.03 µm (mirror surface) (Examples 4 and 8), in-plane luminance uniformity was at maximum at each number of stacks. When the surface roughness Ra of the light incident surface was 3.0 µm or less, degradation of in-plane luminance uniformity as compared to a mirror surface at each number of stacks was suppressed.

On the other hand, as shown in Table 1 and FIG. 6, in a case where the surface roughness Ra of the light incident surface is the smallest, that is, 0.03 µm (mirror surface) (Examples 4 and 8), a decrease in luminance was observed at each number of stacks. When the surface roughness Ra of the light incident surface was 1.0 µm or more, a decrease in luminance at each number of stacks was not observed.

From the results shown in Table 1 and FIGS. 5 and 6, it was demonstrated that conditions for luminance and in-plane luminance uniformity required for final products can be satisfied by appropriately setting the surface roughness Ra of the light incident surface in a range of 3.0 µm or less and adjusting the number of stacks of the light diffusion sheets. For example, for products requiring high in-plane luminance uniformity but allowing a certain degree of decrease in luminance, the surface roughness Ra of the light incident surface of the light diffusion sheet is preferably set at 0.1 µm or less. For products requiring suppression of both degradation of in-plane luminance uniformity and decrease in luminance, the surface roughness Ra of the light incident surface of the light diffusion sheet is preferably set at 1.0 µm or more and 3.0 µm or less.

Although the embodiment (including examples; the same hereinafter) of the present disclosure has been described above, the present disclosure is not limited only to the embodiment described above, and various modifications can be made within the range of disclosure. That is, the foregoing description of the embodiment is merely an example in nature, and is not intended to limit the disclosure, applications, and use of the applications.

DESCRIPTION OF REFERENCE CHARACTERS

1 TFT substrate
2 CF substrate
3 liquid crystal layer
5 liquid crystal display panel
6 first polarizing plate
7 second polarizing plate
21 base material layer
21a first surface
21b second surface
22 recess
40 backlight unit
41 reflective sheet
42 light source
43 light diffusion sheet
44 first prism sheet
45 second prism sheet
46 polarizing sheet
50 liquid crystal display device
50a display screen

The invention claimed is:

1. A backlight unit incorporated in a liquid crystal display device and configured to guide light from a plurality of light sources toward a display screen, the backlight unit comprising:
a light diffusion sheet comprising:
a first surface as a light emission surface; and
a second surface as a light incident surface,
wherein:
the first surface includes a plurality of recesses each having an inverted triangular pyramid shape, an inverted quadrangular pyramid shape, or an inverted hexagonal pyramid shape arranged in two dimensions,
the second surface is a flat surface with an arithmetic mean roughness of 0.1 µm or less,
an internal haze of the light diffusion sheet is 1.5% or less,
the light diffusion sheet is located between the display screen and the plurality of light sources,
the light diffusion sheet is disposed with the second surface facing the plurality of light sources, and
the backlight unit is a direct-lit type backlight unit.

2. The backlight unit according to claim 1, wherein each of the plurality of recesses has an inverted quadrangular pyramid shape.

3. The backlight unit according to claim 1, wherein each of the plurality of recesses has an apical angle of 80° or more and 100° or less.

4. The backlight unit according to claim 1, wherein the plurality of light sources are disposed on a reflective sheet located at a side opposite to the display screen with respect to the light diffusion sheet.

5. The backlight unit according to claim 1, wherein the light diffusion sheet comprises a plurality of the light diffusion sheets that are stacked between the display screen and the plurality of light sources.

6. The backlight unit according to claim 1, wherein a distance between the plurality of light sources and the light diffusion sheet is 10 mm or less.

7. A liquid crystal display device comprising:
the backlight unit according to claim 1; and
a liquid crystal display panel.

8. An information equipment comprising the liquid crystal display device according to claim 7.

9. A backlight unit incorporated in a liquid crystal display device and configured to guide light from a plurality of light sources toward a display screen comprising:
a light diffusion sheet comprising:
a first surface as a light emission surface; and
a second surface as a light incident surface,
wherein:
the first surface includes a plurality of recesses each having an inverted triangular pyramid shape, an inverted quadrangular pyramid shape, or an inverted hexagonal pyramid shape arranged in two dimensions,
the second surface has an arithmetic mean roughness of 1.0 µm or more and 3.0 µm or less,
an internal haze of the light diffusion sheet is 1.5% or less,
the light diffusion sheet is located between the display screen and the plurality of light sources, the light diffusion sheet is disposed with the second surface facing the plurality of light sources, and the backlight unit is a direct-lit type backlight unit.

10. The backlight unit according to claim 9, wherein each of the plurality of recesses has an inverted quadrangular pyramid shape.

11. The backlight unit according to claim 9, wherein each of the plurality of recesses has an apical angle of 80° or more and 100° or less.

12. The backlight unit according to claim 9, wherein the plurality of light sources are disposed on a reflective sheet located at a side opposite to the display screen with respect to the light diffusion sheet.

13. The backlight unit according to claim 9, wherein the light diffusion sheet comprises a plurality of the light diffusion sheets that are stacked between the display screen and the plurality of light sources.

14. The backlight unit according to claim 9, wherein a distance between the plurality of light sources and the light diffusion sheet is 10 mm or less.

15. A liquid crystal display device comprising:
the backlight unit according to claim 9; and
a liquid crystal display panel.

16. An information equipment comprising the liquid crystal display device according to claim 15.

\* \* \* \* \*